United States Patent
Hugoson et al.

[11] 3,748,060
[45] July 24, 1973

[54] SIDEPLATE FOR TURBINE BLADE

[75] Inventors: Birger O. Hugoson, Wallingford, Pa.;
Norbert Vettel, Offenbach/Main,
Buergel, Germany

[73] Assignee: Westinghouse Electric Corporation, Pittsburgh, Pa.

[22] Filed: Sept. 14, 1971

[21] Appl. No.: 180,375

[52] U.S. Cl................... 416/92, 416/96, 416/220
[51] Int. Cl............................ F01d 5/08, F01d 5/18
[58] Field of Search ................... 416/92, 95, 96, 97, 416/220, 221, 219

[56] References Cited
UNITED STATES PATENTS

| | | | |
|---|---|---|---|
| 3,644,058 | 2/1972 | Barnabei et al. | 416/95 |
| 3,572,966 | 3/1971 | Borden et al. | 416/95 |
| 3,043,562 | 7/1962 | Van Nest et al. | 416/221 |
| 2,801,074 | 7/1957 | Brown | 416/221 |
| 3,501,249 | 3/1970 | Scalzo et al. | 416/220 |

*Primary Examiner*—Carlton R. Croyle
*Assistant Examiner*—Robert E. Garrett
*Attorney*—A. T. Stratton et al.

[57] ABSTRACT

Sideplate structure for sealing a chamber between adjacent turbine blades in the periphery of a rotor disc is disclosed. The periphery of the disc is provided with side entry channels for receiving the root portions of rotor blades having radial cooling holes extending from the root portions through the tips of the blades. The channels provide an axially extending passageway communicating with the cooling holes whereby a cooling fluid flows through the passageway and into the holes to cool the blades. Sealing plates are provided for closing the downstream end of the passageways.

A sideplate is provided for each pair of adjacent blades and is disposed on one side of the pair of blades to seal the downstream end of the space between the adjacent blades. The sideplate has a generally T-shaped configuration with an upper main body portion and lower arms extending from the main body. Means are provided on the blade extensions of the rotor blades defining a groove, one side of which on one rotor blade being complementary in shape to the other side thereof on another rotor blade positioned adjacent said one rotor blade. With two blades positioned adjacent each other a generally U-shaped groove having generally circumferentially extending lower sections is defined between the blades. The U-shaped groove is shaped and sized to snugly and slidably receive the sideplate. Locking means are provided for securing the sideplate against unlimited radial downward movement with respect to adjacent rotor blades.

12 Claims, 7 Drawing Figures

SIDEPLATE FOR TURBINE BLADE

BACKGROUND OF THE INVENTION

The present invention relates generally to turbine rotors and particularly to a structure for sealing the downstream end of the chamber between adjacent turbine blades mounted on the rotor disc.

It is a well known practice to use sideplates to secure turbine rotor blades of the side entry type in a rotor disc of an axial flow turbine. In some turbine blade and rotor disc arrangements, sideplates are fitted into grooves formed on both the upstream and downstream sides of the blades and disc, respectively, with the sideplates also serving to seal the root portions of the blades from the motive fluid and to regulate the flow of cooling fluid passing the root portion of the blades. In other arrangements, as where the entire turbine blades are cooled by cooling fluid flowing through radial holes in the blades, the blades are abutted against a ledge of an upstream sideplate mounted on the rotor disc and sideplates are arranged in grooves formed on the downstream side of the blades for securing the blades to the disc.

In many of the known sideplate arrangements, sealing is effected by overlapping the side edges of adjacent sideplates. This overlapping design requires that the sideplates be installed sequentially around the rotor disc and then locked in place with specially shaped locking plates. In order to remove one turbine blade or one sideplate, all of the sideplates to one side thereof must be removed. This is a time consuming and expensive procedure.

The known sideplate structures are also subject to buckling when they are placed under stress due to the centrifugal force attendant with rotation of the rotor disc. Since the sideplates are fixed at their upper edges in the groove that is provided, the centrifugal force will urge the upper edge of the sideplate against the surface of the groove to thereby place the sideplate under compressive stress. Should the sideplate not be strong enough, it will eventually buckle and have to be replaced. Accordingly, the sideplates are designed with a thickness and strength sufficient to prevent buckling. By so designing the sideplates, the weight and cost of the sideplate increases.

The overlapping arrangement of the known sideplates provides a sealing design which is less than desirable. Should the edges of the sideplates be improperly machined, the overlapping will be improper with an ineffective seal resulting. Any buckling of the sideplates will also result in separation of the overlapping and reduction of the sealing effectiveness.

It is desirable in turbines to have the airfoil portion of the turbine blades as far as possible away from the periphery of the rotor disc. The farther away the airfoil is, the cooler will be the rotor disc with the disc thus having a longer useful life. In addition, less expensive material could be used to construct a rotor disc operated at lower temperatures. The blade extensions between the blade platform and the root portion are lengthened for increasing the separation of the airfoil from the rotor disc. With the presently known sideplates, increasing the blade extensions is limited since any increase of the length of the blade extensions would require an increase in length of the sideplates. Increasing the length of the sideplates increases their susceptibility to buckling and diminishes their sealing effectiveness since a greater radial length along the side edges of the sideplates would have to be sealed. In other words, it is desirable to have the sideplates as short as practical to minimize buckling tendency and to keep the overlapping seam as small as possible so as to maintain effective sealing. In order to have short sideplates, however, the blade extensions would have to remain short and therefore the airfoil would be closer to the rotor disc than would be desirable.

BRIEF SUMMARY

The present invention overcomes the undesirable features noted above with respect to the known sideplate structures. Thus, the present invention provides a simple sideplate structure which is easy to assemble and disassemble and may be singly removed and replaced, is shaped to provide an effective seal, and is shaped and arranged for diminishing the tendency to buckle, thereby permitting a thinner construction. The noted advantages result from the novel sideplate structure of the present invention which is generally T-shaped and is used in association with a pair of adjacent turbine blades mounted in axially extending channels provided in the periphery of a rotor disc. The turbine blades are provided with radial holes for receiving cooling fluid flowing in a passageway provided in the channels of the rotor disc. A sealing plate is provided for closing the downstream end of the passageway. Means are provided on the blade extension of each turbine blade for defining a groove, one side of which on one rotor blade is complementary in shape to the other side of the groove on another blade. Thus, when two rotor blades are positoned adjacent each other, a continuous groove is formed between them, the groove being generally U-shaped and having generally circumferentially extending lower sections, the U-shaped groove being shaped to snugly and slidably receive the T-shaped sideplate. The sideplate is secured against unlimited radial downward movement by suitable locking means, such as a removable rivet through the sideplate arranged to engage the top of the rotor disc steeple located between the adjacent turbine blades. When the rotor disc is rotated at high speeds, the sideplate will move radially outwardly in the U-shaped groove due to the effect of centrifugal force. The stress on the sideplate will be borne by its arms thereby placing the upper section of the sideplate in tension which is preferable over the compression to which the known sideplates are subjected. In the preferred embodiment, the lower extensions of the U-shaped grooves are provided with a bevel in the radially divergent direction and the upper edges of the arms of the sideplate are provided with complementary shaped bevels on the upper edges. Thus, when the sideplates move upwardly under the urging of centrifugal force, a wedging action results to provide a positive and effective seal.

THE DRAWINGS

The present invention, along with other details will be best understood from the following detailed description taken in connection with the accompanying drawings in which.

PREFERRED EMBODIMENT

Figure 1:
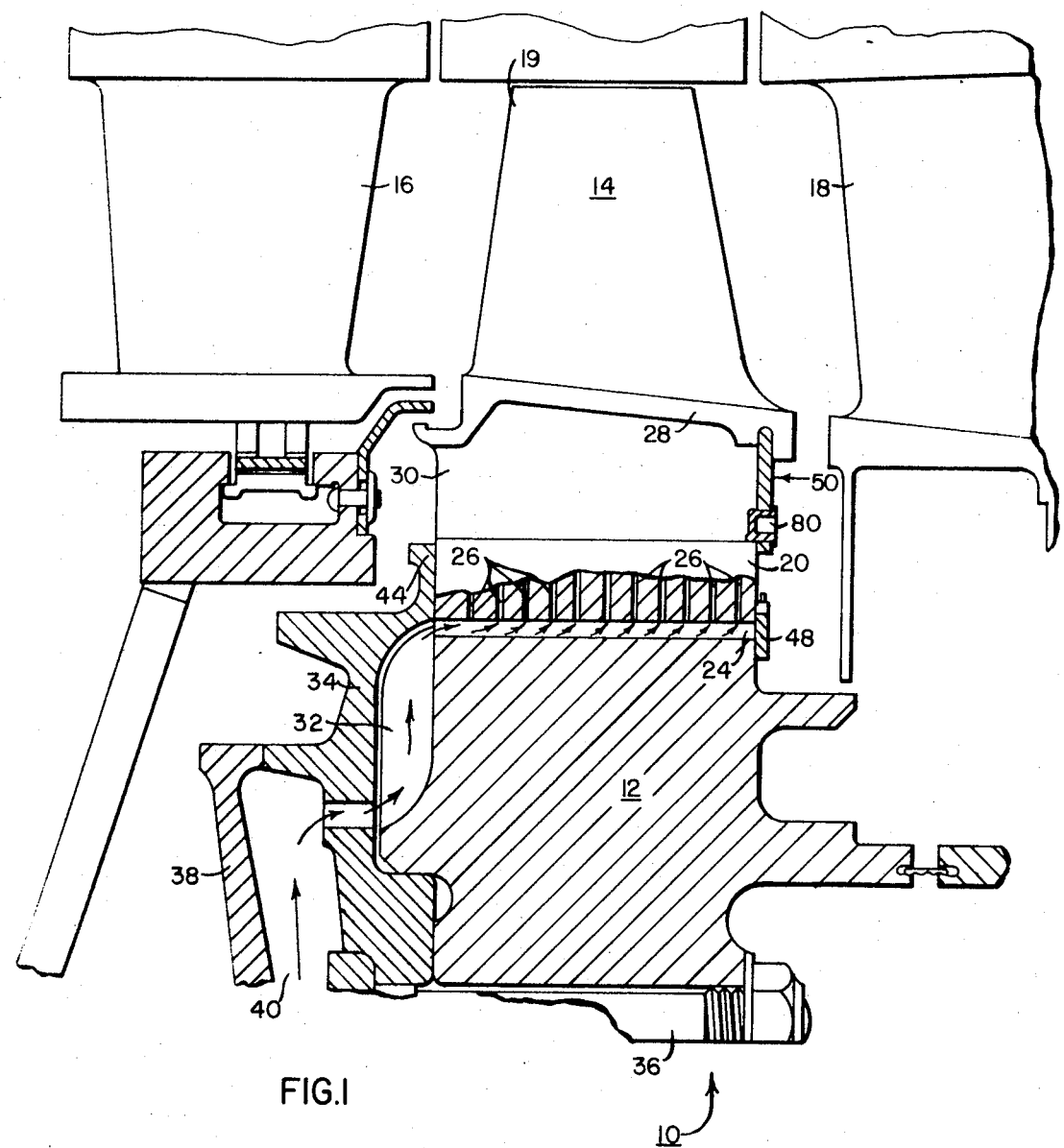
FIG. 1 is a longitudinal radial section of a portion of an axial flow turbine showing a rotor disc and sideplate constructed in accordance with the principles of the present invention.

Referring now to the drawings, FIG. 1 shows a radial portion of a rotor 10 of an axial flow turbine in longitudinal section. The rotor 10 may comprise an aggregate of rotor discs, only one of which 12 is shown, secured together by circumferentially disposed tie or stay bolts extending through the discs.

Figure 2:
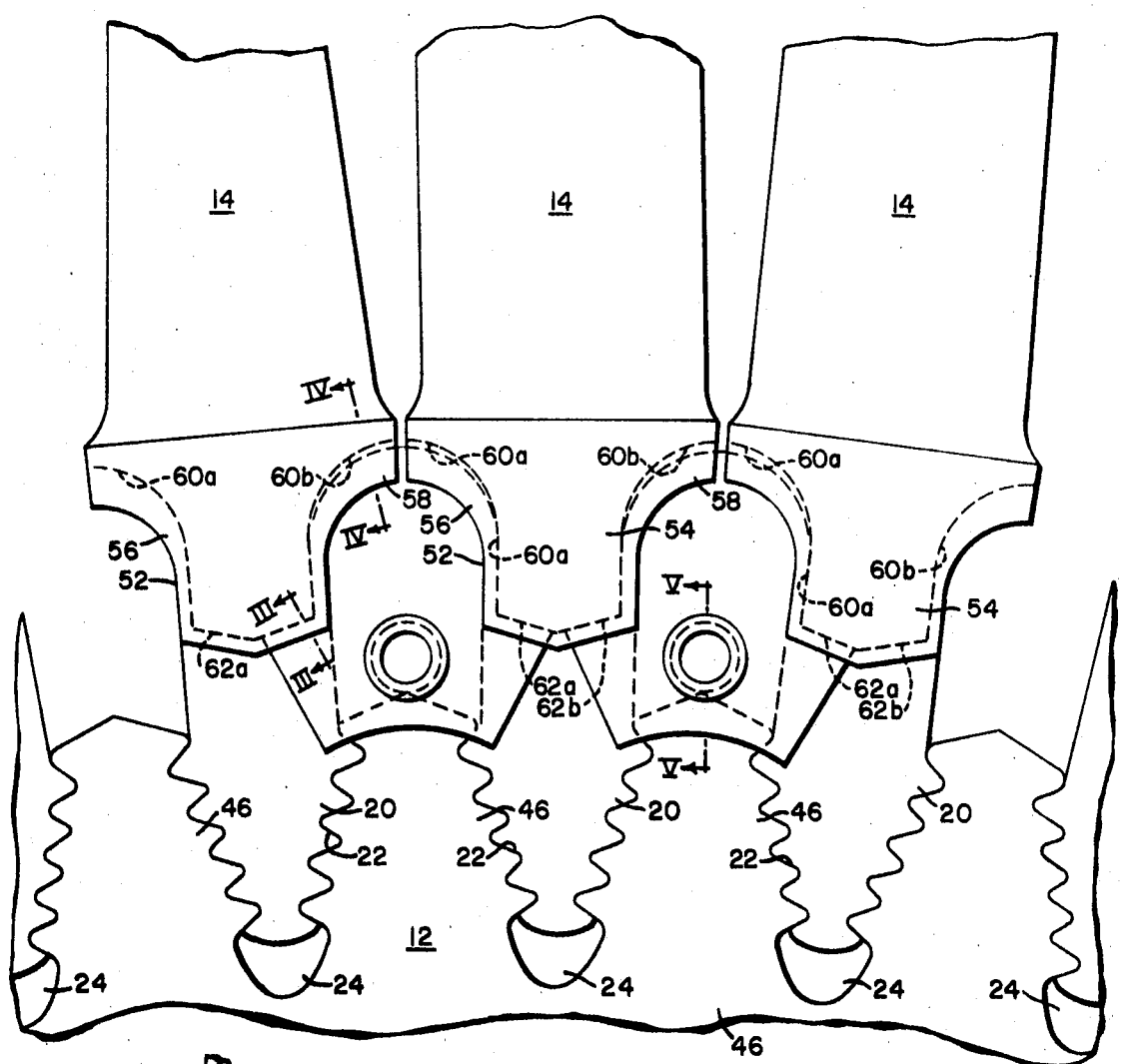
FIG. 2 is a partial side elevation view of a rotor disc showing turbine blades secured therein by sideplates in accordance with the principles of the present invention.
Figure 5:
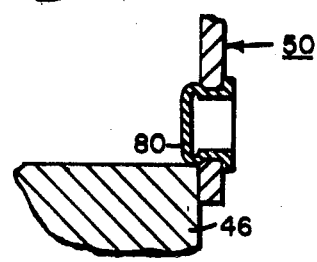
FIG. 5 is a view taken along the line V—V of FIG. 2.

The rotor disc 12 is a first stage disc and supports turbine blades 14 extending radially outwardly therefrom, the blades being disposed between axially spaced inwardly extending fixed vanes or nozzle blades 16 and 18. The turbine blades 14 are provided with an airfoil shaped vane portion 19 and a root portion 20 of the side entry type which may be of the serrated or "fir tree" type for disposition in axially extending serrated channels 22 formed in the outer periphery of rotor disc 12, as shown in FIG. 2. The lower or radial inward portion of the channels 22 are formed and sized to provide a clearance with the lower end of root portion 20 which clearance serves as a passageway 24 for directing cooling fluid between the root portion and the rotor disc as shown. The passageway 24 communicates with radial cooling holes or bores 26 extending from the bottom of the root portion 20 of the blades 14 through the tips of the airfoil portion 19 thereof. The turbine blades 14 are further provided with the usual platform 28 and a blade extension 30 between the platform and the root portion 20.

The rotor disc 12 is also provided with a passageway 32 at the upstream side thereof, and formed by an upstream sideplate 34 secured to the upstream face of the main body portion of the rotor disc by circumferentially disposed tie bolts 36 extending through the upstream sideplate and rotor disc, only one tie bolt being shown in FIG. 1. Passageway 32 is arranged to communicate with passageway 24 in the manner shown. An air separator plate 38 is secured to upstream sideplate 34 in any well known manner, with the separator plate and upstream sideplates shaped to define a passageway 40 communicating with passageway 32. Passageway 40 is connected with a source of cooling fluid, not shown, whereby the cooling fluid will flow through the intercommunicating passageways 40, 32, and 24 and through radial cooling bores 26 for cooling the turbine blades 14.

The upstream sideplate 34 is formed with a radial outer, annular ledge 44 arranged to extend from the top radially outer surface of passageway 24 to slightly beyond a curvilinear plane defined by the radially outermost portions of a plurality of steeples 46 disposed on the rotor disc 12. The ledge 44 serves as the upstream stop for the turbine blades 14 when they are positioned in the channels 22 of the rotor disc 12. The ledge 44 is also designed to provide close abutting contact with the steeples 46 and root portions 20 of the turbine blades 14 to thereby seal the root portions from the hot motive fluid at the upstream side of the turbine blades.

The downstream side of passageway 24 is closed by a tight fitting sealing plate member 48. Sealing plate member 48 is suitably secured to the rotor disc 12, and may be of any well-known design.

Each pair of the adjacent turbine blades 14 mounted in the channels 22 of rotor disc 12 has a sideplate 50 mounted on its downstream side, adapted to seal a void 51 formed by the adjacent blades 14. Each turbine blade 14 has a generally T-shaped blade neck 52 on the downstream side thereof, and extending from the blade platform 28 to an intermediate point on the blade extension 30. The blade neck 52 has a radially extending, centrally disposed center section 54 and generally circumferentially extending upper side sections 56 and 58. The outer edges of the center section 54 and upper side sections 56 and 58 are spaced from the opposing surface of the blade extension 30 to define a continuous groove having upper groove sections 60a and 60b along the side sections 56 and 58 and the radial expance of each side of center section 54, and lower groove sections 62a and 62b at the circumferentially extending portions of the center section 54. The upper groove section 60a and lower groove section 62a of one turbine blade 14 would, thus, be complementary in shape to the upper groove section 60b and lower groove section 62b of another turbine blade 14 arranged in rotor disc 12 adjacent the first blade. With a pair of turbine blades 14 arranged adjacent each other, a generally continuous U-shaped groove is defined between the upper and lower groove sections of one side of one blade and the upper and lower groove sections of the other side of the other blade. The U-shaped groove between the two adjacent turbine blades 14 has a central section (60a and 60b) and opposite generally circumferentially extending lower sections (62a and 62b). As shown in the drawings, the uppermost portions of upper groove sections 60a and 60b are circular in outline whereby when the U-shaped groove is formed between adjacent turbine blades a semicircular groove is defined at the upper region thereof.

Figure 4:
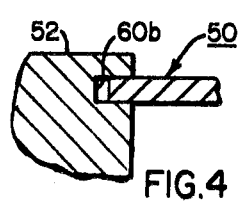
FIG. 4 is a view taken along the line IV—IV of FIG. 2.
Figure 3:
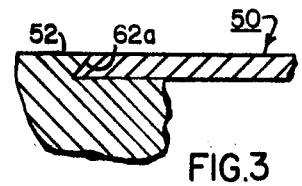
FIG. 3 is a view taken along the line III—III of FIG. 2.
Figure 6:
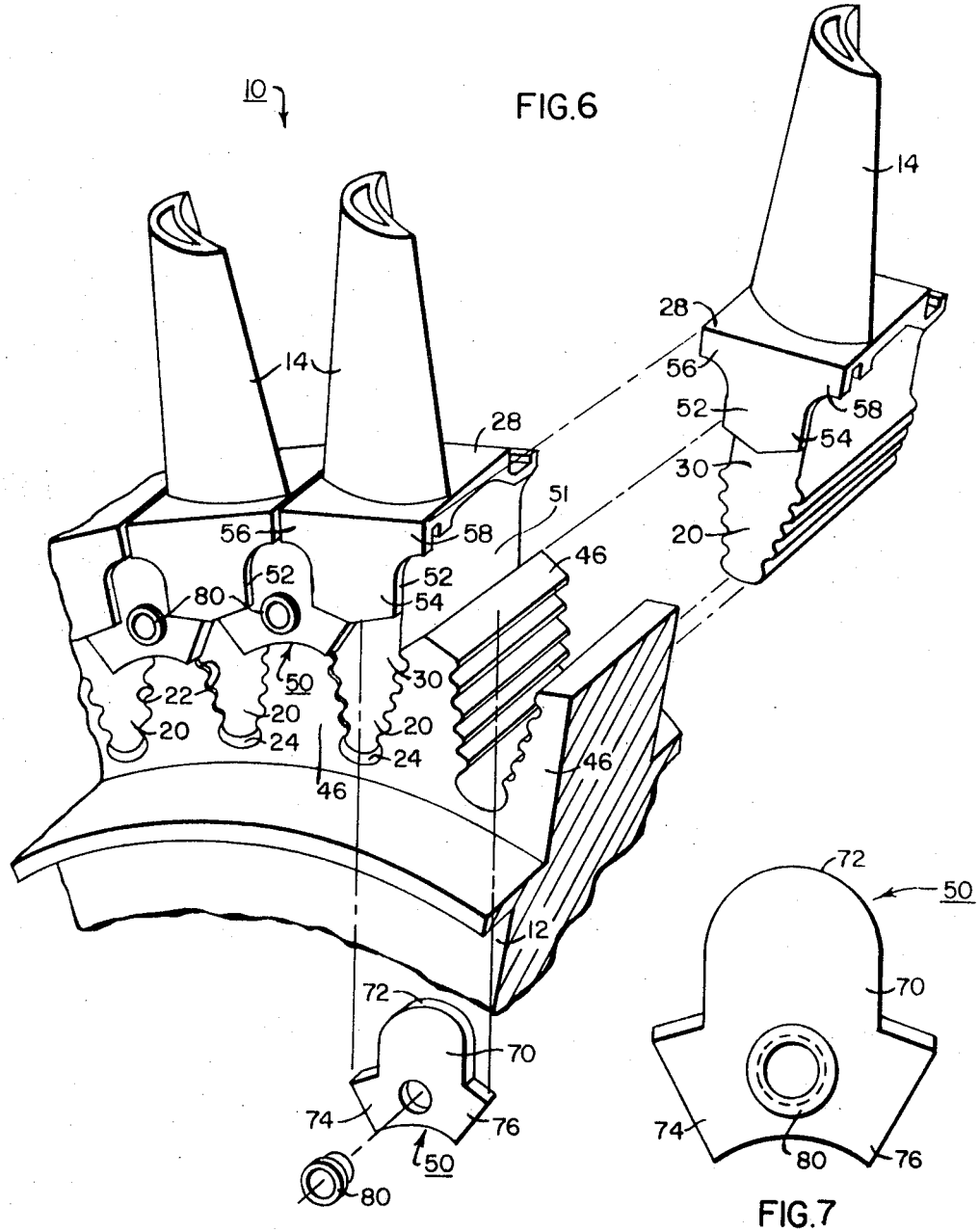
FIG. 6 is a perspective view of turbine rotor blades and a portion of a rotor disc showing sideplate structures securing blades to the rotor disc in accordance with the invention.
Figure 7:
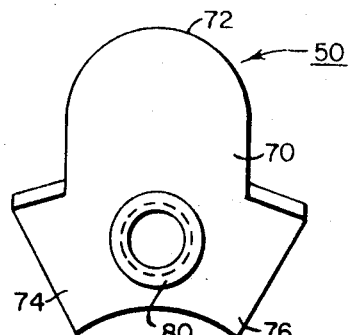
FIG. 7 is an elevation view of a sideplate forming part of the present invention.

As shown in FIG. 4, the cross-sectional shape of the upper groove sections 60a and 60b are generally rectangular. The lower groove sections 62a and 62b are, as shown in FIG. 3, provided with a bevelled inner surface, the inclination of the level in a radially divergent direction with respect to rotor disc 12.

Each sideplate 50 is shaped to be snugly and slidably received in the U-shaped groove defined between adjacent pairs of turbine blades 12. Each sideplate 50 has a main body portion 70 having a generally semicircular shaped upper section 72, and arms 74 and 76 extending generally circumferentially from a lower portion of the main body 70. The outer edges of main body 70 are sized and shaped to snugly fit within the upper groove sections 60a and 60b in the manner shown generally in FIG. 2. The upper edges of arms 74 and 76 are provided with a bevel complementary in shape to the bevelled surface of lower groove sections 62a and 62b. The edges of arms 74 and 76 will engage the surface of lower groove sections 62a and 62b in the manner shown in FIG. 3. Each sideplate 50 is simply installed by sliding it along the surface of the steeple 46 between an adjacent pair of turbine blades 14 and into the U-shaped groove defined between the blades.

Each sideplate 50 is secured against unlimited radial downward movement with respect to the rotor disc 12 by means of a lock rivet 80 inserted in an opening through an intermediate portion of the sideplate 50. The lock rivet 80 is arranged to engage the top of a steeple 46 of rotor disc 12. The lock rivet 80 is of any well known configuration and is simply installed by inserting the blank rivet in the opening through sideplate 80 and expanded by striking the rivet with a locking tool. For removal, the lock rivet 80 is hit with a convex tool that stretches the rivet into a generally cylindrical shape to permit the rivet to be simply removed from the opening of the sideplate 50. It should be noted, however, that any other suitable removable locking device, such as a locknut, could be used to secure a sideplate 50 against moving radially inwardly of the rotor disc 12.

As the rotor disc 12 is rotated, a centrifugal force will be imparted to the sideplates 50 which will, at the higher disc speeds, cause the sideplates 50 to move radially outwardly in the U-shaped grooves. Each sideplate 50 is sized such that the arms 74 and 76 will engage the lower groove sections 62a and 62b with a clearance existing between the upper section 72 of the sideplate and the opposite upper surfaces of the upper groove sections 60a and 60b. Thus, the stress on the sideplates 50 resulting from the effect of the centrifugal force imparted thereto will be borne by the arms 74 and 76 thereby placing the main body 70 of the sideplate under tension. Such a condition of tension on the main portion of the sideplates 50, rather than compression as would be the case if the upper section of the sideplates bore the stress from the centrifugal force, reduces the possibility of buckling of the sideplates 50. The clearance between the upper section 72 of the sideplates 50 and the opposite groove surface insures that the stress on the sideplates 50 is borne by the arms 74 and 76.

As the sideplates 50 move radially outwardly under the urging of centrifugal force, the bevel edges of arms 74 and 76 engage the bevelled surfaces of lower groove sections 62a and 62b to thereby force the sideplate up against the surface of the blade extension 28 and steeples 46. Thus, a tight fit is realized between the sideplates 50, the turbine blades 14, and the rotor disc 12.

Since the sideplates 50 are not readily susceptible to buckling, thinner material may be used as compared with sideplates used heretofore, with attendant savings in weight and cost. Also, the structure of the sideplates 50 and the arrangement thereof with the turbine blades 14 does not limit the length that the blade extensions 28 may be made. Thus, the arrangement of sideplates 50 permits longer blade extensions 28 which would result in a cooler rotor disc 12 thereby lengthening the useful life of the disc and allowing the use of less expensive material of use in constructing the disc. In addition, each of the sideplates 50 may be assembled and disassembled individually without moving the adjacent sideplates.

Though the invention has been shown and described in preferred form, it will be obvious to those skilled in the art that it is not so limited, but is susceptible of many changes without departing from the spirit and scope thereof.

We claim:

1. In a rotor for an axial flow fluid machine, the rotor comprising at least one rotor disc with a plurality of spaced channels provided in the periphery thereof for receiving the root portions of a plurality of rotor blades having radial cooling bores extending from the root portions through the tips of the blades, a passageway extending axially and disposed radially inwards of each of the root portions, said passageways communicating with the cooling bores and being capable of conducting a flow of cooling fluid therethrough, a steeple between adjacent channels on the periphery of the disc, a chamber disposed radially outwards of the steeples between adjacent blades, and sealing means closing the downstream end of the passageways, the improvement comprising:

a side plate associated with each pair of adjacent blades and disposed on one side of said pair of blades for sealing one end of said chamber between adjacent blades;

said sideplate having a generally T-shaped configuration with a body portion and arms extending from the body portion;

a platform extension on said rotor blades having means disposed thereon for defining a groove, one side of which on one rotor blade is complementary in shape to the other side thereof on another rotor blade positioned adjacent said one rotor blade, whereby when said rotor blades are positioned adjacent, the groove defined, has a generally U-shaped section and a generally circumferentially extending radially inward section, said U-shaped section being shaped to slidably receive said sideplate, and locking means for securing said sideplate against unlimited radial inward movement with respect to said rotor disc.

2. The structure recited in claim 1 in which said arms of said sideplate are sized and shaped to engage said groove defining means during rotation of said rotor disc in such a manner that the centrifugal force acting on the sideplate is borne by said arms with said body of said sideplate radially outward of said arms being in tension.

3. The structure as recited in claim 1 in which said radially inward circumferentially extending sections of said groove are bevelled in a radially divergent direction, and said arms of said sideplate are provided with bevelled radially outward edges complementary in shape to the bevelling of said radially inward circumferentially extending sections of said groove.

4. The structure recited in claim 2 in which said body portion of said sideplate is sized such that during rotation of said rotor disc a clearance will exist between the radially outward edge of said body portion and the opposite face of said U-shaped section of said groove.

5. The structure recited in claim 1 in which said locking means comprises a removable member extending through an intermediate portion of said body portion of said sideplate in a position to engage the radially outward portion of the rotor disc steeple located between said pair of adjacent blades.

6. The structure recited in claim 5 in which said removable member is a lock rivet.

7. In a rotor for an axial flow fluid machine, the rotor comprising at least one rotor disc with a plurality of side entry channels provided in the periphery thereof for receiving the root portions of a plurality of side entry rotor blades having radial cooling bores extending from the root portions through the vane portions of the blades, a passageway extending axially and disposed radially inwards of each of the root portions, said passageways communicating with the cooling bores and being capable of conducting a flow of cooling fluid therethrough, steeples between adjacent channels on the periphery of the disc, a chamber disposed radially outwards of the steeples and between adjacent blades, and sealing means closing the downstream end of the passageways, the improvement comprising:

- a sideplate associated with each pair of adjacent blades and disposed on one side of said pair of blades for sealing one end of said chambers between adjacent blades;
- each rotor blade being provided with an extended blade neck portion, a blade platform portion, said platform having a ledge on its downstream side defining a generally radially inwardly directed groove, a portion of each groove being more radially inward and said radially inward sections defining a generally circumferentially extending section of the groove; said groove sections at one side of any of said rotor blades, being complementary to the groove sections at the other side of another rotor blade whereby when two rotor blades are positioned adjacent each other a continuous generally U-shaped groove is defined for securing each side plate on the downstream side of two respective adjacent blades;
- said sideplate having a body portion having edges to slidably fit within the radially outer groove sections of said U-shaped groove configuration between adjacent rotor blades, and arms extending generally circumferentially from a radially inward portion of said body and having radially outer edges of said arms shaped to snugly fit within the radially inward groove section of said U-shaped groove; and
- locking means for securing said sideplate against unlimited radial inward movement with respect to said disc.

8. The structure recited in claim 7 in which said arms of said sideplate are sized and shaped to engage said side sections of said blade neck during rotation of said rotor disc in such a manner that the centrifugal force acting on the sideplate is borne by said arms with said body of said sideplate radially outward of said arms being in tension.

9. The structure recited in claim 7 in which said radially inward groove sections are bevelled in a radially divergent direction, and said arms of said sideplate are provided with bevelled radially outward edges complementary in shape to the bevelling of said radially inward generally circumferentially extending groove sections.

10. The structure recited in claim 7 in which said locking means is a removable member extending through an intermediate portion of said body of said sideplate in a position to engage the top of the rotor disc steeple between said pair of adjacent blades when said rotor disc is at rest or at low speed rotation.

11. The structure recited in claim 8 in which said body portion of said sideplate is sized such that during high speed rotation of said rotor disc a clearance will exist between the radially outward edge of said body and the opposite face of said U-shaped section of said groove.

12. The structure recited in claim 10 in which said removable member is a lock rivet.

* * * * *